(12) United States Patent
Huang

(10) Patent No.: US 7,349,299 B2
(45) Date of Patent: Mar. 25, 2008

(54) METHOD OF OPTICAL DISC DISCRIMINATION

(75) Inventor: Ying-Feng Huang, Lucao Township (TW)

(73) Assignee: Mediatek Inc. (TW)

( * ) Notice: Subject to any disclaimer, the term of this patent is extended or adjusted under 35 U.S.C. 154(b) by 526 days.

(21) Appl. No.: 10/904,879

(22) Filed: Dec. 2, 2004

(65) Prior Publication Data
US 2005/0174907 A1  Aug. 11, 2005

(30) Foreign Application Priority Data
Feb. 11, 2004  (TW) .............................. 93103193 A

(51) Int. Cl.
*G11B 7/00* (2006.01)
(52) U.S. Cl. .............................. 369/44.37; 369/112.03; 369/53.24
(58) Field of Classification Search ............. 369/44.37, 369/53.31
See application file for complete search history.

(56) References Cited

U.S. PATENT DOCUMENTS

| | | | |
|---|---|---|---|
| 2002/0176342 A1* | 11/2002 | Worthington et al. ..... | 369/53.31 |
| 2003/0080274 A1* | 5/2003 | Izumi et al. ............. | 250/201.5 |
| 2003/0095486 A1* | 5/2003 | Furuichi et al. ......... | 369/53.22 |
| 2004/0130986 A1* | 7/2004 | Minase et al. ............ | 369/47.39 |
| 2004/0184376 A1* | 9/2004 | Ishibashi et al. ........... | 369/53.1 |
| 2005/0185539 A1* | 8/2005 | Shimano et al. ......... | 369/44.37 |

* cited by examiner

*Primary Examiner*—Wayne Young
*Assistant Examiner*—Van T. Pham
(74) *Attorney, Agent, or Firm*—Connolly Bove Lodge & Hutz LLP

(57) ABSTRACT

A method for discriminating between different types of optical discs is intended to apply to an optical storage device with a pick-up head having three beams. A main beam push-pull signal and a sub-beam push-pull signal, both acquired by means of the photo-detector of the pick-up head, are superposed on each other to have an additive push-pull signal, whereas, on subtraction, the difference between the main beam push-pull signal and the sub-beam push-pull signal generates a differential push-pull signal. If the peak-to-peak voltage of the differential push-pull signal is greater than that of the additive push-pull signal, it is judged that the light spots derived from the sub-beams and the main beam of the three beams respectively fall on two contiguous lands and a groove therebetween on an optical disc inside the optical storage device. Also, if the peak-to-peak voltage of the differential push-pull signal is smaller than that of the additive push-pull signal, it is judged that the light spots derived from the sub-beams and the main beam separately fall on three contiguous grooves on the optical disc respectively.

16 Claims, 4 Drawing Sheets

METHOD OF OPTICAL DISC DISCRIMINATION

BACKGROUND OF THE INVENTION

1. Field of the Invention

The present invention relates to a method for discriminating between different types of optical discs, more particularly to discriminating between different types of optical discs in accordance with the relationships created after the synthesis of push-pull signals by the pick-up head (PUH) of an optical storage device.

2. Description of the Related Art

The great progress in information technology has led to a ceaseless increase in the number of ways to store data. In this regard, the optical storage device has apparently become an important data storage tool available on the market. For an optical storage device to operate, an electromechanical actuator drives a pick-up head so as to focus laser beams on an optical disk. Then, any saved binary data is read and judged by the magnitude of the light rays reflected to a photo-detector; meanwhile, the reflected rays function as servo control signals, for example, tracking error signals and focus error signals, for driving the pick-up head. In other words, the laser spots are accurately focused on a right track, using such an optical signal to drive the pick-up head.

FIG. 1 is a schematic diagram of the optical system of the pick-up head in an optical storage device. A laser ray 16 is generated by a laser diode (LD) 11 and then, with a phase grating 12, divided into three rays of light, namely a leading sub-beam 16b, a main beam 16a and a lagging sub-beam 16c. Then the three rays of light pass through a beam splitter 13 and an objective lens 14 before they fall on an optical disc 80 and form a secondary light spot 162, a primary light spot 161 and a secondary light spot 163 in a groove 81 and lands 82 respectively.

Three reflective rays are formed where each of the three light spots appears. Then the reflective rays are directed to a photo-detector 15 by the beam splitter 13. Data of the reflective rays are received by a primary receipt portion 151 and secondary receipt portions 152 and 153 of the photo-detector 15, respectively. As shown in FIG. 1, each of the receipt portions is further divided into two regions, wherein the primary receipt portion 151 comprises region A and region B, the secondary receipt portion 152 comprises region C and region D, and the secondary receipt portion 153 comprises region E and region F. Hence, it is feasible to acquire synthesized signals that conform to the following equations:

$$MPP=A-B;$$

$$SPP=(C+E)-(D+F);$$

where MPP denotes a main beam push-pull signal, SPP denotes a sub-beam push-pull signal, and A through F denote optical signals read by respective optical receipt regions.

Conventionally, an optical storage device determines whether or not an optical disc is a DVD-RAM (Digital Versatile Disc-Random Access Memory) disc, using the Differential Push-Pull (DPP) method, that is, subtracting a sub-beam push-pull signal from a main beam push-pull signal in order to obtain a differential push-pull signal, as expressed with the following equation:

$$DPP=MPP-SPP=(A-B)-\{(C+E)-(D+F)\}$$

If the peak-to-peak voltage of the DPP signal is greater than a default threshold value, it is judged that the optical disc being read is a DVD-RAM disc, otherwise the optical disc is categorized as another type of DVD, such as DVD-ROM (Read-Only Memory), DVD-R (Recordable), or DVD-RW (Rewritable) disc. However, a variety of DVDs take considerable discrepancies between conditions for light ray reflection. Thus, with only one threshold value setting, it is rather difficult to discriminate between different types of DVDs, and it may even be unlikely that every attempt to discriminate between different types of DVDs will bring an inaccurate judgment.

SUMMARY OF THE INVENTION

The primary objective of the present invention is to provide a method for discriminating between different types of optical discs. The method is intended to discriminate between different types of optical discs, in accordance with the comparison relationships between the synthesized signals of a main beam push-pull signal and a sub-beam push-pull signal, with a view to enhancing the accuracy of identifications made on categorization of optical discs by an optical storage device.

In order to achieve the objective, the present invention discloses a method for discriminating between different types of optical discs, which is intended to apply to an optical storage device with a pick-up head having three beams. A main beam push-pull signal and a sub-beam push-pull signal, both acquired by means of the photo-detector of the pick-up head, are superposed on each other to have an additive push-pull signal, whereas, on subtraction, the difference between the main beam push-pull signal and the sub-beam push-pull signal generates a differential push-pull signal. If the peak-to-peak voltage of the differential push-pull signal is greater than that of the additive push-pull signal, it is judged that the light spots derived from the sub-beams and the main beam of the three beams respectively fall on two contiguous lands and a groove therebetween on an optical disc inside the optical storage device. Also, if the peak-to-peak voltage of the differential push-pull signal is less than that of the additive push-pull signal, it is judged that the light spots derived from the sub-beams and the main beam separately fall on three contiguous grooves on the optical disc respectively.

As regards an optical disc that is a DVD-RAM disc, since the disc-radial component of the interval between a primary light spot and a secondary light spot equals the interval between a land and a groove, which adjoin each other, the primary light spot and the secondary light spot fall on the centers of a land groove and a groove land respectively, which adjoin each other thereon, and in consequence the peak-to-peak voltage of the differential push-pull signal is greater than that of the additive push-pull signal. Conversely, as for an optical disc that is any other types of DVD, since the disc-radial component of the interval between the primary light spot and the secondary light spot equals the interval between two adjoining grooves, the primary light spot and the secondary light spot respectively fall on the centers of three contiguous grooves thereon, and in consequence the peak-to-peak voltage of the differential push-pull signal is less than that of the additive push-pull signal.

BRIEF DESCRIPTION OF THE DRAWINGS

The invention will be described according to the appended drawings in which:

FIG. 2(*b*) is a waveform diagram on processing optical signals of a DVD-RAM disc.

PREFERRED EMBODIMENT OF THE PRESENT INVENTION

Figure 1:
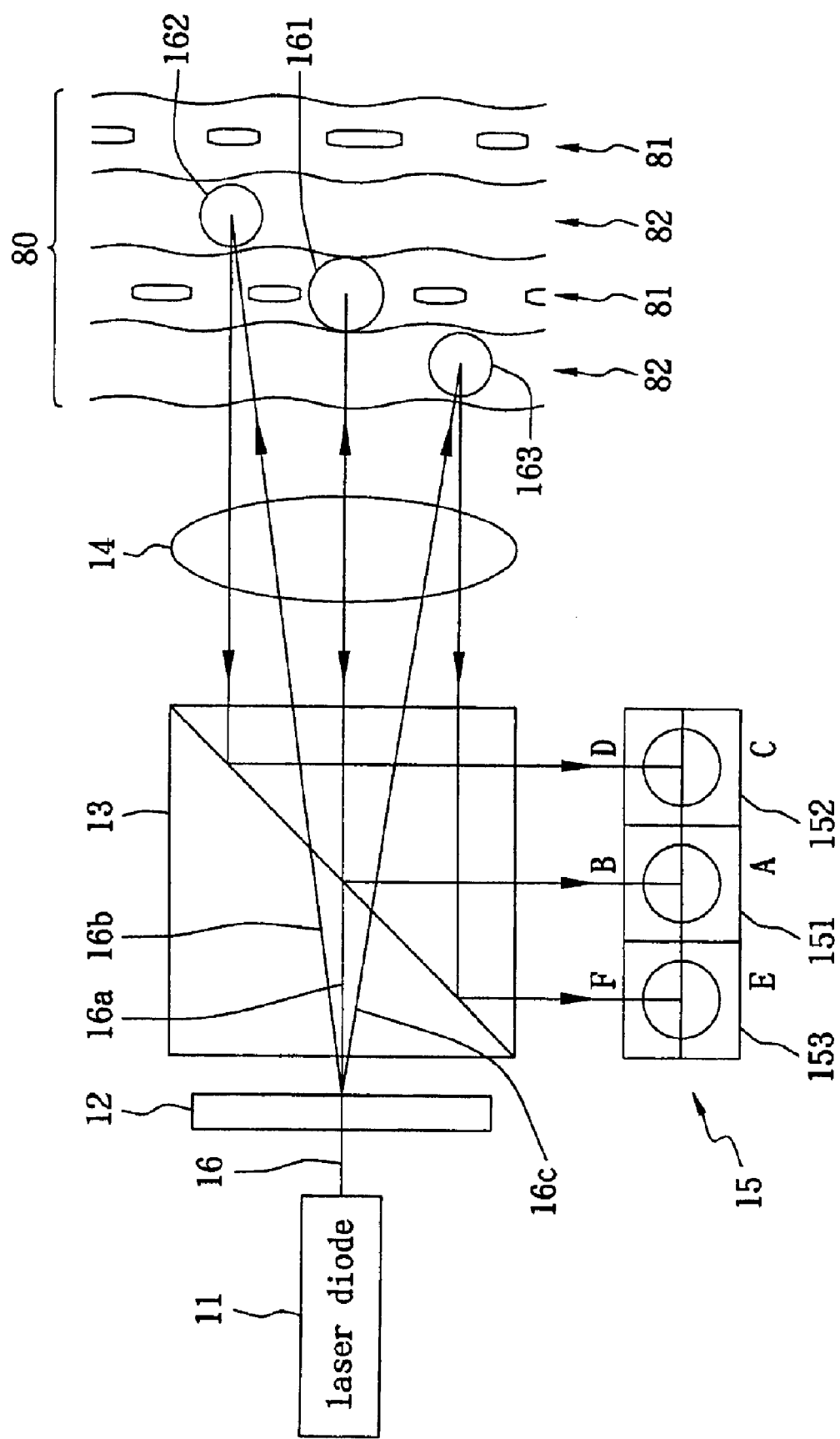
FIG. 1 is a schematic diagram of the optical system of the pick-up head in an optical storage device.
Figure 2A:
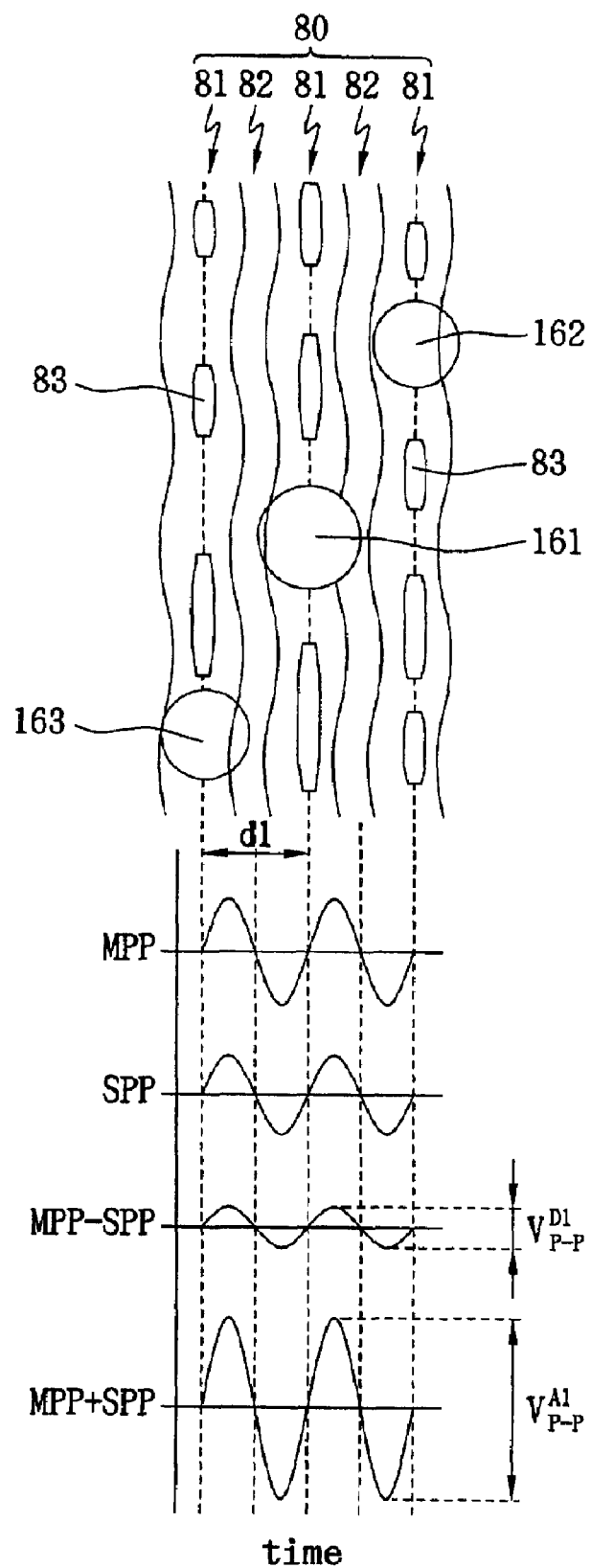
FIG. 2(*a*) is a waveform diagram on processing optical signals of a non-RAM type DVD.
Figure 2B:
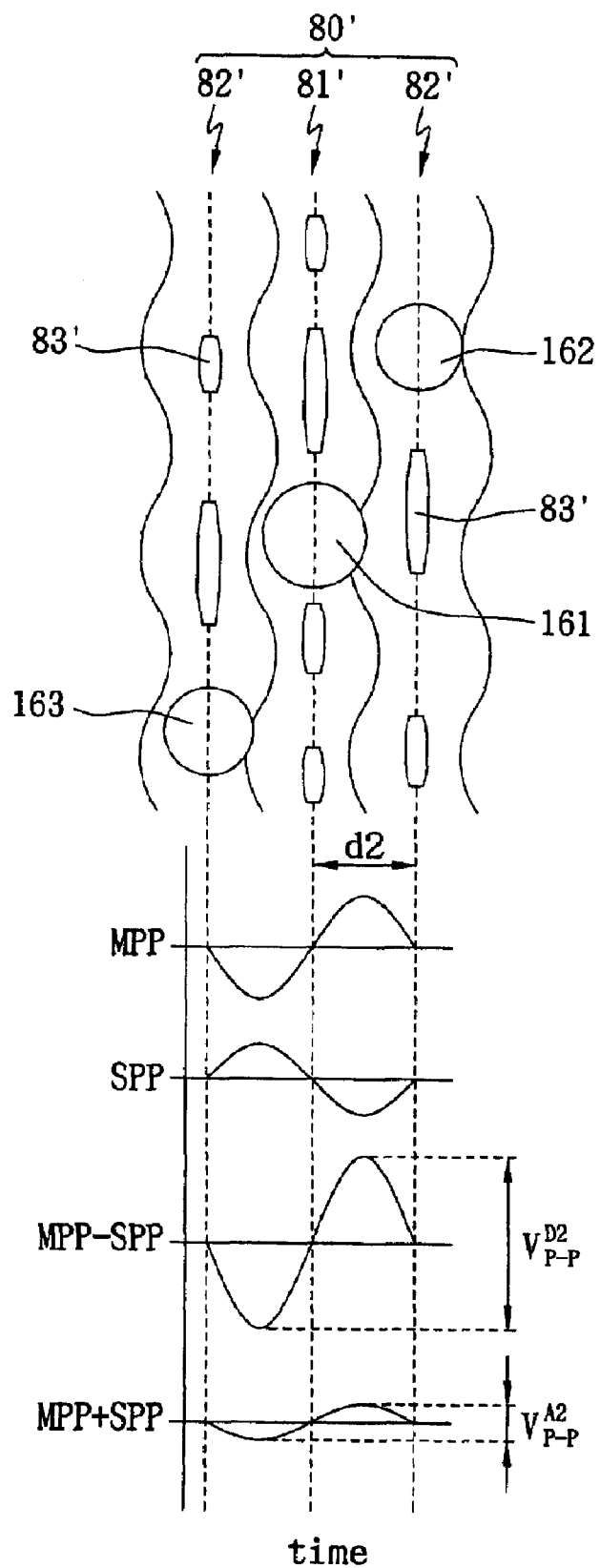

FIG. 2(*a*) is a waveform diagram on processing optical signals of a non-RAM type DVD disc, such as DVD±R, DVD±RW and DVD-ROM disc, in accordance with the present invention. The optical disc 80 is a non-RAM type DVD disc, thus pits 83 intended for data storage are merely found in the groove 81 whereas the interval d1 between two contiguous grooves 81 is 0.74 µm approximately. The primary light spot 161 derived from one of the three focused beams falls on the centers of the grooves 81, and meanwhile the accompanying secondary light spots 162 and 163 fall on the centers of the bilateral adjoining grooves 81. At this point, the potential of the main beam push-pull signal MPP is disposed at its slice level, whereas that of the sub-beam push-pull signal SPP is also disposed at its slice level.

The potential of the main beam push-pull signal and that of the sub-beam push-pull signal increase gradually and simultaneously whenever the pick-up head moves to the right slightly. However, the potential of the main beam push-pull signal and that of the sub-beam push-pull signal decrease gradually and simultaneously whenever the pick-up head moves to the left slightly. In other words, both the main beam push-pull signal and the sub-beam push-pull signal manifest the same change in their phase in response to the tracking of the pick-up head. If subtracted, the difference between the main beam push-pull signal and the sub-beam push-pull signal generates a differential push-pull signal (MPP−SPP). Obviously, since the main beam push-pull signal and the sub-beam push-pull signal are synchronized in phase, their amplitudes offset each other when the differential push-pull signal is derived from aforesaid subtraction operation. Hence, the peak-to-peak voltage $V_{P-P}^{D1}$ of the differential push-pull signal has a relative smaller value. By contrast, the main beam push-pull signal and the sub-beam push-pull signal are superposed on each other to generate an additive push-pull signal (MPP+SPP), and consequently the peak-to-peak voltage $V_{P-P}^{A1}$ of the additive push-pull signal has a larger value, as shown in FIG. 2(*a*).

FIG. 2(*b*) is a waveform diagram about processing optical signals of a DVD-RAM disc. The optical disc 80' is a DVD-RAM disc, thus the pits 83' intended for data storage are not only found in a groove 81' but are also disposed in the lands 82'. The interval d2 between the contiguous groove 81' and land 82' is 0.714 µm approximately. The primary light spot 161 derived from one of the three focused beams falls on the center of the groove 81', whereas the accompanying secondary light spots 162 and 163 fall on the centers of the bilateral adjoining lands 82'. At this point, the potential of the main beam push-pull signal MPP is disposed at its slice level, whereas that of the sub-beam push-pull signal SPP is also disposed at its slice level.

The potential of the main beam push-pull signal and that of the sub-beam push-pull signal vary in opposite phases simultaneously, that is, the main beam push-pull signal increases gradually, whereas the sub-beam push-pull signal decreases gradually, whenever the pick-up head moves to the right slightly. By contrast, although the potential of the main beam push-pull signal and that of the sub-beam push-pull signal also vary in opposite phases simultaneously, the main beam push-pull signal decreases gradually, whereas the sub-beam push-pull signal increases gradually, whenever the pick-up head moves to the left slightly.

If subtracted, the difference between the main beam push-pull signal and the sub-beam push-pull signal generates a differential push-pull signal (MPP−SPP). Obviously, since the main beam push-pull signal and the sub-beam push-pull signal are in opposite phases, their amplitudes instead superposed each other when the differential push-pull signal is derived from aforesaid subtraction operation. Hence, the peak-to-peak voltage $V_{P-P}^{D2}$ of the differential push-pull signal has a larger value. By contrast, the main beam push-pull signal and the sub-beam push-pull signal are superposed on each other to generate an additive push-pull signal (MPP+SPP). Since the main beam push-pull signal and the sub-beam push-pull signal are in opposite phases, their amplitudes offset each other when the additive push-pull signal is derived from aforesaid addition operation. Hence, the peak-to peak-voltage $V_{P-P}^{A2}$ of the additive push-pull signal has a smaller value, as shown in FIG. 2(*b*).

The detailed explanations embodied in FIGS. 2(*a*) and 2(*b*) lead to the following relations about discriminating between different types of optical discs:

If the relation is (MPP−SPP)>(MPP+SPP), it is judged that the optical disc is a DVD-RAM disc, and If the relation is (MPP+SPP)>(MPP−SPP), it is judged that the optical disc belongs to a DVD family, which excludes a DVD-RAM disc.

In fact, if the peak-to-peak voltage of the differential push-pull signal is greater than that of the additive push-pull signal, it is judged that the light spots derived from the sub-beams and the main beam of the three beams can fall on contiguous lands and a groove, between the lands, on the optical disc. However, if the peak-to-peak voltage of the differential push-pull signal is smaller than that of the additive push-pull signal, it is judged that all the light spots derived from the sub-beams and the main beam can fall on three contiguous grooves on the optical disc. In short, according to the present invention, by comparing the peak-to-peak voltage of differential push-pull signals with that of additive push-pull signals, geometrical relationships between the primary/secondary light spots and the grooves/lands on optical discs are identified, and various types of optical discs are defined by means of the aforesaid geometrical relationships.

On the other hand, by comparing the phase of the waveform of the main beam push-pull signal with that of the sub-beam push-pull signal, it is feasible to determine which type of optical disc it is. If the waveform of the main beam push-pull signal and that of the sub-beam push-pull signal are in opposite phases, it is judged that the optical disc is a DVD-RAM disc. However, if the waveform of the main beam push-pull signal and that of the sub-beam push-pull signal are in the same phase, it is judged that the compact disc belongs to a DVD family, which excludes a DVD-RAM disc.

Figure 3:
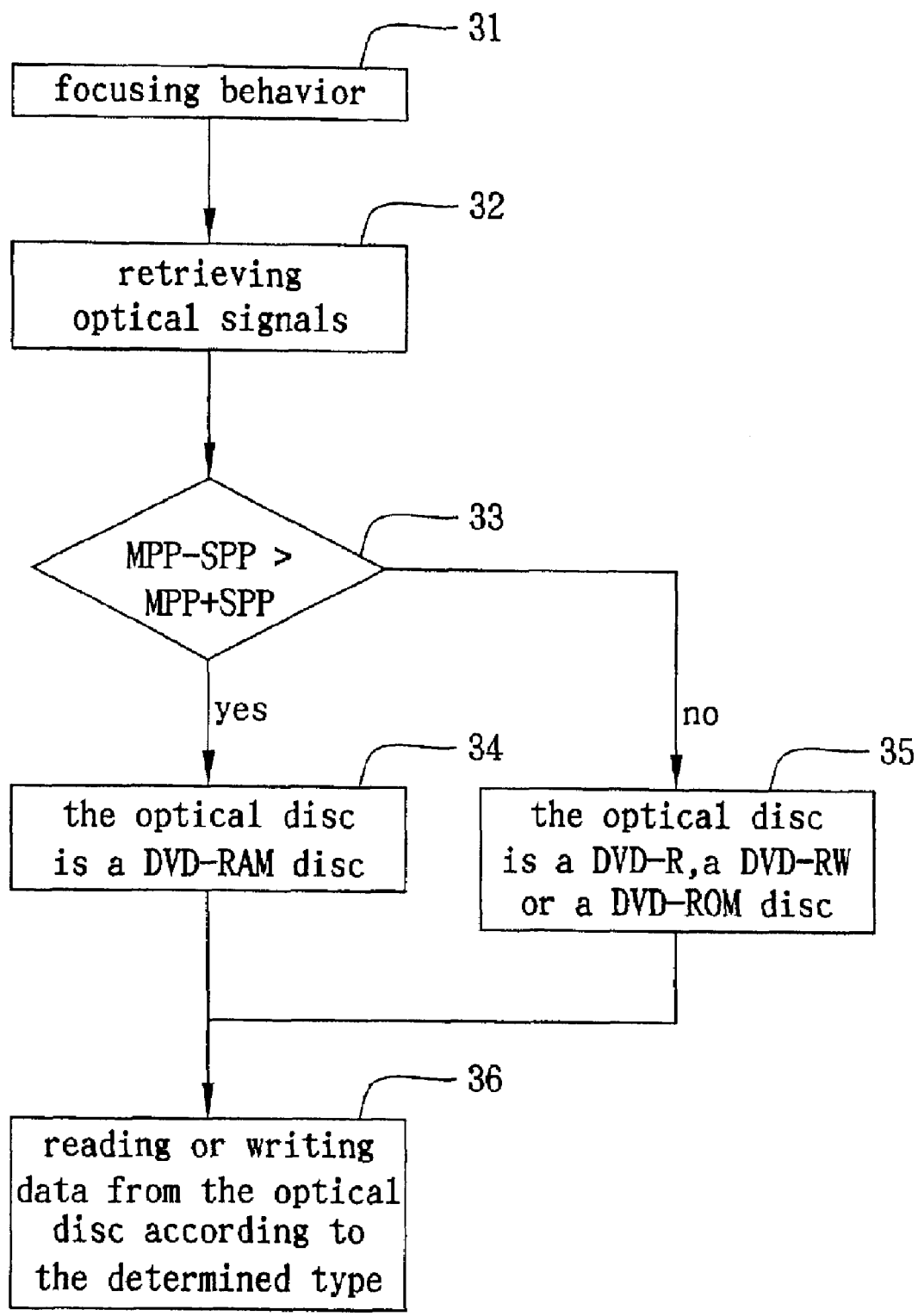
FIG. 3 is a flowchart on discriminating between different types of optical discs.

FIG. 3 is a flowchart about discriminating between different types of optical discs. As shown in Step 31, the pick-up head moves upward and downward for the sake of focusing, that is, the focus is identified by means of focusing error signals. In Step 32, the photo-detector retrieves related optical signals required to discriminate between different types of optical discs. Step 33 involves comparing the peak-to-peak voltage of (MPP−SPP) with that of (MPP+

SPP). If Step 33 yields a negative answer, then it is judged that the optical disc is a DVD-R, a DVD-RW or a DVD-ROM disc, as shown in Step 35. Conversely, if Step 33 yields an affirmative answer, then it is judged that the optical disc is a DVD-RAM disc, as shown in Step 34. After the type of the optical disc is identified, data are read from or stored on the optical disc in accordance with the identified type, as shown in Step 36.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. A method of optical disc discrimination for an optical storage device having a pick-up head with three beams, comprising the steps of:
   adding a main beam push-pull signal and a sub-beam push-pull signal together, both acquired from the pick-up head, to have an additive push-pull signal;
   subtracting the sub-beam push-pull signal from the main beam push-pull signal to have a differential push-pull signal; and
   identifying the optical disc as a RAM type disc if the peak-to-peak voltage of the differential push-pull signal is greater than that of the additive push-pull signal.

2. The method of optical disc discrimination of claim 1, wherein the optical disc belongs to a disc family, which excludes the RANT type disc, if the peak-to-peak voltage of the differential push-pull signal is smaller than that of the additive push-pull signal.

3. The method of optical disc discrimination of claim 1, wherein the RANT type disc is a DYD-RAIVI disc.

4. The method of optical disc discrimination of claim 3, wherein the main beam push-pull signal and the sub-beam push-pull signal are in opposite phases.

5. The method of optical disc discrimination of claim 2, wherein the main beam push-pull signal and the sub-beam push-pull signal are synchronized in phase.

6. The method of optical disc discrimination of claim 2, wherein the disc family C, includes DYD-ROM, DVDR and DVDRW discs.

7. The method of optical disc discrimination of claim 1, wherein the three beams fall on the optical disc and form a primary light spot and two secondary light spots thereon.

8. A method of optical disc discrimination for an optical storage device having a pick-up head with three beams, comprising the steps of:
   comparing the phase of a main beam push-pull signal with that of a sub-beam push-pull signal, both acquired from the pick-up head; and
   identifying the optical disc as a RAM type disc if the main beam push-pull signal and sub-beam push-pull signal are in opposite phases.

9. The method of optical disc discrimination of claim 8, wherein the optical disc belongs to a disc family, which excludes the RALN'I type disc, if the main beam push-pull signal and sub-beam push-pull signal are synchronized in phase.

10. The method of optical disc discrimination of claim 9, wherein the disc family includes DYD-ROM, DVDR and DVDRW discs.

11. A method of optical disc discrimination for an optical storage device having a pick-up head with three beams, comprising the steps of:
    performing a focusing behavior on the pick-up head;
    retrieving optical signals from the pick-up head;
    adding a main beam push-pull signal and a sub-beam push-pull signal together, both acquired from the pick-up head, to have an additive push-pull signal;
    subtracting the sub-beam push-pull signal from the main beam push-pull signal to have a differential push-pull signal;
    identifying the optical disc as a RAM type disc if the peak-to-peak voltage of the differential push-pull signal is greater than that of the additive push-pull signal, otherwise identifying the optical disc as a non-RANT type disc; and
    reading or writing data from the optical disc according to the identified type.

12. The method of optical disc discrimination of claim 11, wherein the RAiN/I type disc is a DYD-RAIVI disc.

13. The method of optical disc discrimination of claim 12, wherein the main beam push-pull signal and sub-beam push-pull signal are in opposite phases.

14. The method of optical disc discrimination of claim 11, wherein the main beam push-pull signal and sub-beam push-pull signal are synchronized in phase if the optical disc is identified as a non-RANT type disc.

15. The method of optical disc discrimination of claim 11, wherein the non-RAM type disc is a DYD-ROM, a DVD+R, a DVD-R, a DVD+RW or a DVD-RW disc.

16. The method of optical disc discrimination of claim 11, wherein the three beams fall on the optical disc and form a primary light spot and two secondary light spots thereon.

* * * * *